United States Patent [19]

Haas et al.

[11] 4,248,930
[45] Feb. 3, 1981

[54] THE PRODUCTION OF POLYURETHANE RESINS AND LAMINATES

[75] Inventors: Peter Haas, Haan; Johannes Blahak, Cologne; Werner Mormann, Leverkusen; Manfred Kapps, Bergisch-Gladbach, all of Fed. Rep. of Germany

[73] Assignee: Bayer Aktiengesellschaft, Leverkusen Bayerwerk, Fed. Rep. of Germany

[21] Appl. No.: 107,310

[22] Filed: Dec. 26, 1979

Related U.S. Application Data

[63] Continuation of Ser. No. 920,563, Jun. 29, 1978, abandoned.

[30] Foreign Application Priority Data

Jul. 16, 1977 [DE] Fed. Rep. of Germany .... P2732292

[51] Int. Cl.$^3$ .................. C08G 18/14; C08G 18/18; B32B 27/40; C08K 5/20
[52] U.S. Cl. ................................ 428/315; 428/424.6; 521/51; 521/121; 521/125; 521/126; 521/127; 521/128; 521/129; 521/130; 528/48; 528/49; 528/52; 528/53; 528/57; 528/58; 544/404
[58] Field of Search ............... 521/129; 528/54; 260/45.9 AD; 428/315, 425

[56] References Cited

U.S. PATENT DOCUMENTS

| 3,168,497 | 2/1965 | Twitchett | 521/129 |
|---|---|---|---|
| 4,007,140 | 2/1977 | Ibbotson | 521/129 |
| 4,022,720 | 5/1977 | Blahak et al. | 521/129 |
| 4,049,591 | 9/1977 | McEntire et al. | 521/129 |
| 4,080,343 | 3/1978 | Raden | 521/129 |
| 4,143,003 | 3/1979 | Haas et al. | 521/129 |

FOREIGN PATENT DOCUMENTS 2085965 12/1971 France .
1338275 11/1973 United Kingdom .

Primary Examiner—H. S. Cockeram
Attorney, Agent, or Firm—Gene Harsh; Joseph C. Gil; R. Brent Olson

[57] ABSTRACT

A process is disclosed for producing polyurethane resins using novel catalysts selected from the group consisting of a process for the production of cellular or non-cellular polyurethane resins comprising reacting:
(a) polyisocyanates; with
(b) compounds having at least 2 isocyanate reactive hydrogen atoms; in the presence of
(c) tertiary amines as catalysts; optionally with the addition of
(d) blowing agents, stabilizers and other known additives; characterized in that the substances used as component (c) comprise compounds selected from the group consisting of

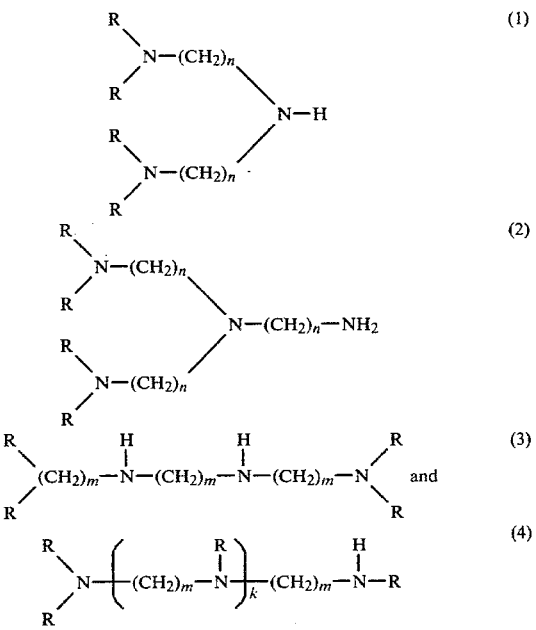

and mixtures thereof in which formulae:
the symbols R may be the same or different and represent straight or branched-chain alkyl groups having from 1 to 4 carbon atoms;
the symbols n may be the same or different and represent 2 or 3;
the symbols m may be the same or different and represent 2 or 3; and
k represents an integer of from 1 to 5.

The process may also be carried out in the presence of other tertiary amine catalysts, particularly compounds containing one tertiary nitrogen atom and at least one amide group.

The novel catalysts of the invention function as age-resistors and light-protective agents.

10 Claims, No Drawings

THE PRODUCTION OF POLYURETHANE RESINS AND LAMINATES

This is a continuation of application Ser. No. 920,563 filed June 29, 1978, now abandoned.

BACKGROUND OF THE INVENTION

Polyurethane foams with a wide variety of physical properties have long been manufactured on a commercial scale by the known isocyanate polyaddition process from compounds containing several active hydrogen atoms, in particular compounds containing hydroxyl and/or carboxyl groups, and polyisocyanates with the addition of water and/or blowing agents and optionally catalysts, emulsifiers and other additives (Angew. Chem. A, 59 (1948), page 257). Given a suitable choice of components, either flexible or rigid foams or any products between these extremes may be obtained.

Polyurethane foams are preferably produced from liquid starting components, either by mixing all the starting materials together in a one-shot process or by first preparing a prepolymer containing isocyanate groups from a polyol and an excess of polyisocyanate and then foaming this prepolymer, e.g. by reaction with water.

Tertiary amines have become well established as catalysts for the production of polyurethane foams. They accelerate the reaction of hydroxyl and carboxyl groups with isocyanate groups (urethane reaction) and the reaction between water and isocyanates (blowing reaction). The velocities of the two reactions which take place simultaneously in the one-shot process have to be adjusted relative to each other.

Cross-linking reactions which give rise to the formation of allophanate, biuret and cyanurate structures take place during the foaming process in addition to the reactions mentioned above.

In view of the large number of reactions taking place, the catalyst must be chosen so that it ensures synchronous adjustment of the reactions to each other. At the same time the catalyst must not be fixed too early in the process by incorporation in the foam, nor must it subsequently accelerate hydrolytic degradation of the foam product. This problem has not up to now been completely solved. The unpleasant smell of many of the tertiary amines used in practice is another disadvantage. Moreover, polyurethane foams, both alone and laminated with colored synthetic resin foils (e.g. PVC foils) tend to undergo yellowing or discoloration and blackening on exposure to heat or light in the presence of the industrially used amine catalysts, such as "Dabco" or bis-(dialkylaminoalkyl)-ethers (see, e.g. German Offenlegungsschrift No. 1,804,361 and U.S. Pat. No. 3,330,782. Blackening of colored synthetic resin foils of the kind used commercially for cladding polyurethane foams, e.g. in motor car seats, refrigerator bodies and electrical instruments, is particularly troublesome. These disadvantageous effects prevent polyurethane foams and polyurethane synthetic resins from being used in fields of application for which they would otherwise be suitable.

Catalysts have now surprisingly been found which, used alone or as mixtures with known amine catalysts, prevent the discoloration of foam-laminated synthetic resin foils (e.g. PVC foils) on exposure to heat and/or light. These catalysts also prevent the effects of ageing in polyurethane synthetic resins which have been foamed in unrestricted space.

DESCRIPTION OF THE INVENTION

The present invention relates to a process for the production of cellular or non-cellular polyurethane resins by the reacton of (a) polyisocyanates; with (b) compounds having at least 2 isocyanate-reactive hydrogen atoms; in the presence of (c) tertiary amines as catalysts; optionally with the addition of (d) blowing agents, stabilizers and other known additives; which process is characterized in that the compounds used as component (c) comprise:

(A) compounds of the following general formulae:

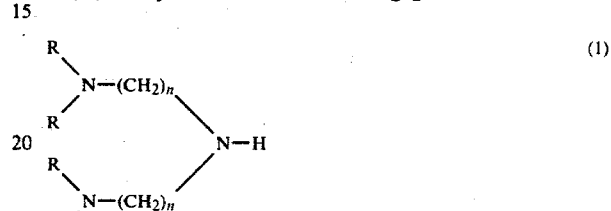

(1)

and/or

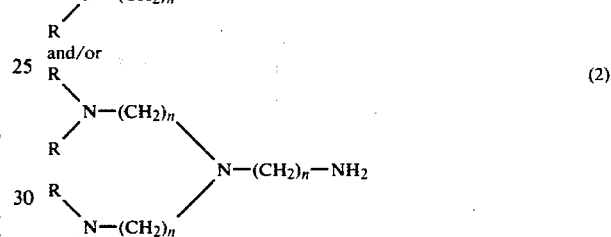

(2)

and/or

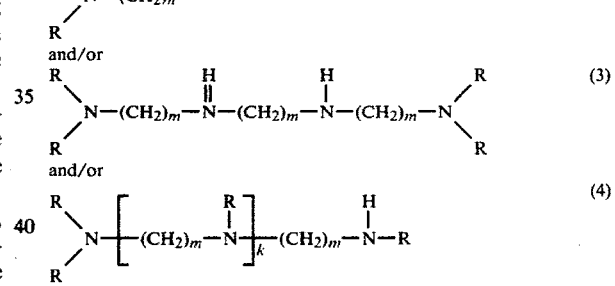

(3)

and/or $$R\diagdown N{-}{\Big[}(CH_2)_m{-}\underset{|}{\overset{R}{N}}{\Big]}_k{-}(CH_2)_{m'}{-}\underset{|}{\overset{H}{N}}{-}R \qquad (4)$$

optionally as mixtures with (B) other tertiary amines as co-catalysts, in which formulae:
the symbols R represent, independently of each other, straight or branched-chain alkyl groups having from 1 to 4 carbon atoms, and preferably methyl groups;
the symbols n represent, independently of each other, either 2 or 3, and preferaby 3;
the symbols m represent, independently of each other, either 2 or 3, preferably 2; and
k represents an integer of from 1 to 5.

The catalysts (A) are preferably compounds corresponding to general formulae (1) or (2).

The catalysts corresponding to general formulae (1) to (4) are superior to those tertiary amines already known by virtue of their stabilizing action against thermal and photochemical ageing. This is presumably due to the fact that in spite of their high content of active hydrogen atoms, they are only very slowly built into the polyurethane during the foaming process because of steric hindrance. They therefore have the surprising characteristic of being able to develop their stabilizing power at the phase interfaces between the polyurethane resin and the synthetic resin coating.

In addition to compounds (A) corresponding to general formulae (1) to (4), known amine catalysts (B) may be used in the process according to the present invention in a quantity of from 3 to 97 mol %, preferably from 10 to 90 mol % and most preferably from 30 to 70 mol %, based on the total quantity of catalyst. Examples of such known amine catalysts include tertiary amines containing ether groups according to U.S. Pat. No. 3,330,782, German Auslegeschrift No. 1,030,558 and German Offenlegungsschrift No. 1,804,361 and the catalysts described in German Offenlegungsschriften Nos. 2,624,527 and 2,624,528 which have at least 4 tertiary nitrogen atoms and are free from ether groups. The co-catalysts (B) used according to the present invention, however, preferably have at least one amide group in addition to at least one tertiary nitrogen atom, and in particular a formamide group. Such acylated amines have been described in some detail in German Offenlegungsschrift No. 2,523,633. Particularly preferred for the process according to the present invention are the formamides of compound (A) corresponding to general formulae (1) to (4), as well as the formamides corresponding to the following general formulae:

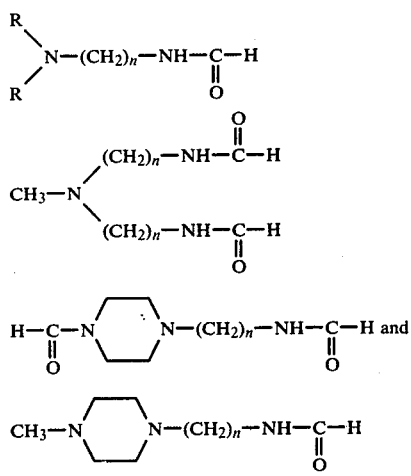

wherein R and n are as defined above.

The formamides may be obtained by formylation process known per se, e.g. by reacting the amine with formic acid or with formamide, ammonia being split off. These reactions are well-known and described, e.g. by F. Möller in Houben-Weyl, Methods of Organic Chemistry, Vol. XI/2, page 27–30.

The following tertiary amines are examples of catalysts or co-catalysts which may be used according to the present invention:

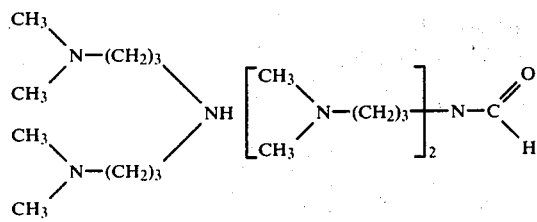

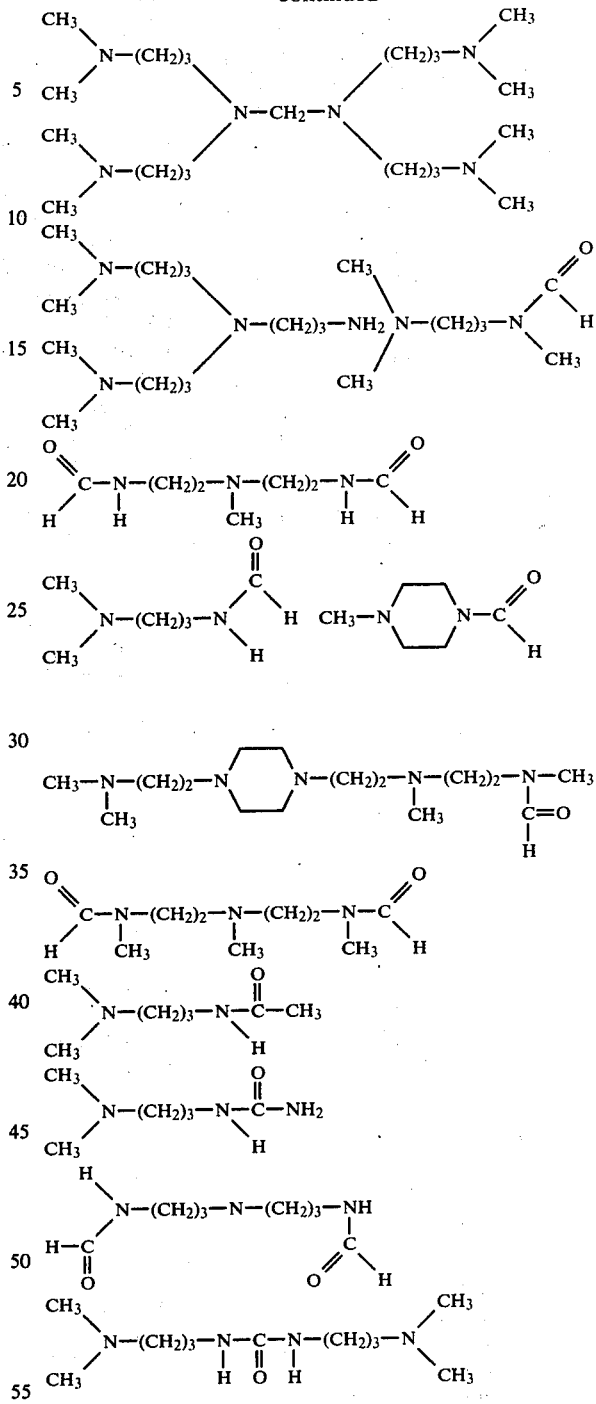

The co-catalysts which may be used according to the present invention may be prepared in known manner, for example as described in German Offenlegungsschrift No. 2,523,633, German Auslegeschrift No. 1,154,269 and in "Die Angewandte Makromolekulare Chemie" 34, pages 111 to 132 (1973) and by F. Möller in Houben-Weyl, XI/2 (pages 27 to 29).

According to the present invention, the total quantity of catalyst used is generally from 0.01 to 5% by weight, preferably from 0.1 to 3% by weight, based on the total quantity of reaction mixture.

The polyisocyanates used as starting components according to the present invention may be aliphatic, cycloaliphatic, araliphatic, aromatic or heterocyclic polyisocyanates, such as those described, for example, by W. Siefken in Justus Liebig's Annalen der Chemie, 562, pages 75 to 136. These include ethylene diisocyanate; tetramethylene-1,4-diisocyante; hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785 and U.S. Pat. No. 3,401,190); hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -4,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyanate; triphenylmethane-4,4', 4'''-triiosocyanate; polyphenyl-polymethylene polyisocyanates which may be obtained by aniline/formaldehyde condensation followed by phosgenation and which have been described, for example, in British Pat. Nos. 874,430 and 848,671; m and p-isocyanatophenylsulphonyl isocyanates according to U.S. Pat. No. 3,454,606; perchlorinated aryl polyisocyanates such as those described, for example, in German Auslegeschrift No. 1,157,601 (U.S. Pat. No. 3,277,138); polyisocyanates having carbodiimide groups as described in German Pat. No. 1,092,007 (U.S. Pat. No. 3,152,162); diisocyanates of the kind described in U.S. Pat. No. 3,492,330; polyisocyanates containing allophanate groups as described e.g. in British Pat. No. 994,890, in Belgian Pat. No. 761,626 and in published Dutch Pat. Application No. 7,102,524; polyisocyanates containing isocyanurate groups, e.g. as described in U.S. Pat. No. 3,001,973, in German Pat. Nos. 1 022 789, 1,222,067 and 1,027,394 and in German Offenlegungsschriften Nos. 1,929,034 and 2,004,048; polyisocyantes containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described, e.g. in German Pat. No. 1,101,394 (U.S. Pat. Nos. 3,124,605 and 3,201,372) and in British Pat. No. 889,050; polyisocyanates prepared by telomerization reactions as described, for example, in U.S. Pat. No. 3,654,106; polyisocyanates having ester groups such as those mentioned, for example, in British Pat. Nos. 965,474 and 1,072,956, in U.S. Pat. No. 3,567,763 and in German Pat. No. 1,231,688; reaction products of the above mentioned isocyanates with acetals according to German Pat. No. 1,072,385; and polyisocyanates containing polymeric fatty acid groups according to U.S. Pat. No. 3,455,883.

The distillation residues obtained from the commercial production of isocyanates which still contain isocyanate groups may also be used, optionally as solutions in one or more of the above-mentioned polyisocyanates. Mixtures of the above-mentioned polyisocyanates may also be used.

As a general rule, it is particularly preferred to use polyisocyanates which are readily available commercially such as tolylene-2,4-diisocyanate and -2,6-diisocyanate and mixtures of these isomers ("TDI"); polyphenyl-polymethylene polyisocyanates of the kind which may be prepared by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The starting components used according to the present invention also include compounds, generally having a molecular weight of from 400 to 10,000 which have at least two isocyanate-reactive hydrogen atoms. These compounds may contain amino groups, thiol groups or carboxyl groups, but are preferably polyhydroxyl compounds, and in particular compounds having from 2 to 8 hydroxyl groups, and especially those having a molecular weight of from 800 to 10,000, preferably from 1,000 to 6,000. These include polyesters, polyethers, polythioethers, polyacetals, polycarbonates and polyester amides having at least 2, generally from 2 to 8, but preferably from 2 to 4, hydroxyl groups of the kind known for the production of both homogeneous and cellular polyurethanes.

Suitable polyesters containing hydroxyl groups include, the reaction products of polyhydric, preferably dihydric alcohols, optionally with the addition of trihydric alcohols and polybasic, preferably dibasic, carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or they may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols; ethylene glycol, propylene glycol-(1,2) and -(1,3), butylene glycol-(1,4) and (2,3), hexanediol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polyethers used according to the present invention, have at least 2, generally from 2 to 8, and preferably 2 or 3, hydroxyl groups are also known and are prepared, for example, by the polymerization of epoxides, such as ethylene oxide, propylene oxide, butylene oxide, tetrahydrofuran, styrene oxide, or epichlorohydrin, either each on its own, e.g. in the presence of boron trifluoride, or by addition of these epoxides, optionally as mixtures or successively, to starting components having reactive hydrogen atoms. Such starting components include water, alcohols, ammonia or amines, e.g. ethylene glycol, propylene glycol-(1,3) or -(1,2), trimethylolpropane, 4,4'-dihydroxydiphenylpropane, aniline, ethanolamine or ethylene diamine. Sucrose polyethers may also be used according to the present invention, e.g. those described in German Auslegeschriften Nos. 1,176,358 and 1,064,938. In many cases it is preferred to use polyethers which contain predominantly primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers (U.S. Pat. Nos. 3,383,351, 3,304,273, 3,523,093 and 3,110,695 and German Pat. No. 1,152,536) are also suitable, as well as polybutadienes which have hydroxyl groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether esters amides, depending on the co-components.

Suitable polyacetals include, for example, the compounds which may be prepared from the reaction of glycols, such as diethylene glycol, triethylene glycol, 4,4'-dioxethoxy-diphenyl dimethylmethane and hexanediol, with formaldehyde. Suitable polyacetals for the purposes of the present invention may also be prepared by the polymerization of cyclic acetals.

Suitable polycarbonates containing hydroxyl groups used include those which can be prepared by the reaction of diols, such as propanediol-(1,3), butanediol-(1,4) and/or hexanediol-(1,6), diethylene glycol, triethylene glycol or tetraethylene glycol with diarylcarbonates, e.g. diphenylcarbonate, or with phosgene.

Suitable polyester amides and polyamides include, for example, the predominantly linear condensates prepared from polybasic saturated and unsaturated carboxylic acids or their anhydrides and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenol/formaldehyde resins or of alkylene oxides and urea/formaldehyde resins are also suitable for the purposes of the present invention.

Representatives of these compounds which may be used according to the present invention have been described, for example, in High Polymers, Vol. XVI, "Polyurethanes, Chemistry and Technology" by Saunders-Frisch, Interscience Publishers, New York, London, Volume I, 1962, pages 32-42 and pages 44-54 and Volume II, 1964, pages 5-6 and 198-199 and in Kunststoff-Handbuch, Volume VII, Vieweg-Höchtlen, Carl-Hanser-Verlag, Munich, 1966, e.g. on pages 45 to 71.

Mixtures of the above-mentioned compounds which contain at least two isocyanate-reactive hydrogen atoms and have a molecular weight of from 400 to 10,000 may, of course, also be used, e.g., mixtures of polyethers and polyesters.

The starting components used according to the present invention may also include, optionally as mixtures with the above mentioned higher molecular weight compounds, compounds having a molecular weight of from 32 to 400 which have at least two isocyanate-reactive hydrogen atoms. These componds are also understood to be compounds containing hydroxyl groups and/or amino groups and/or thiol groups and/or carboxyl groups, though preferably hydroxyl groups and/or amino groups, and they serve as chain-lengthening agents or cross-linking agents. They generally have from 2 to 8 isocyanate-reactive hydrogen atoms, and preferably 2 or 3 such hydrogen atoms.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol, sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy-diphenyl propane, dihydroxymethylhydroquinone, ethanolamine, diethanolamine, triethanolamine, 3-aminopropanol, ethylene diamine, 1,3-diaminopropane, 1-mercapto-3-aminopropane, 4-hydroxyphthalic acid, 4-aminophthalic acid, succinic acid, adipic acid, hydrazine, N,N-dimethylhydrazine, 4,4'-diaminodiphenylmethane, tolylenediamine, methylene-bis-chloroaniline, methylene-bisanthranilic acid ester, diaminobenzoic acid esters and the isomeric chlorophenylene diamines.

In this case again, there may be used mixtures of various compounds having a molecular weight of from 32 to 400 and containing at least two isocyanate-reactive hydrogen atoms.

According to the present invention, there may also be used polyhydroxyl compounds which contain high molecular weight polyadducts or polycondensates in a finely dispersed or dissolved form. Such modified polyhydroxyl compounds are obtained when polyaddition reactions (e.g. reactions between polyisocyanates and amino functional compounds) or polycondensation reactions (e.g. between formaldehyde and phenols and/or amines) are carried out in situ in the above-mentioned hydroxyl compounds. Such processes have been described, for example, in German Auslegeschriften Nos. 1,168,075 and 1,260,142 and in German Offenlegungsschriften Nos. 2,324,134, 2,423,984, 2,512,385, 2,513,815, 2,550,796, 2,550,797, 2,550,833, and 2 550 862. These modified polyhydroxyl compounds may also be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

When such modified polyhydroxyl compounds are used as starting components for the polyisocyanate-polyaddition process, polyurethane resins with substantially improved mechanical properties are obtained in many cases.

According to the present invention, water and/or readily volatile organic substances may be used as blowing agents. Suitable organic blowing agents include, for example, acetone, ethyl acetate and halogen-substituted alkanes, such as methylene chloride, chloroform, ethylidene chloride, vinylidene chloride, monofluorotrichloromethane, chlorodifluoromethane, and dichlorodifluoromethane, as well as butane, hexane, heptane, and diethyl ether. The effect of the blowing agent may also be obtained by the addition of compounds which decompose at temperatures above room temperature to release gases, such as nitrogen, e.g. azo compounds, such as azoisobutyric acid nitrile. Further examples of blowing agents and the use of blowing agents have been described in Kunststoff-Handbuch Volume VII, published by Vieweg and Höchtlen, Carl-Hanser-Verlag, Munich 1966, e.g. on Pages 108 and 109, 453 to 455 and 507 to 510.

Other known catalysts may, of course, be used in addition in the process according to the present invention, for example tertiary amines, such as triethylamine, tributylamine, N-methylmorpholine, N-ethylmorpholine, N-cocomorpholine, N,N,N',N'-tetramethylethylenediamine, 1,4-diazabicyclo-(2,2,2)-oxtane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole and 2-methylimidazole. Known Mannich bases obtained from secondary amines, such as dimethylamine, and aldehydes, preferably formaldehyde, or ketones, such as acetone, methyl ethyl ketone or cyclohexanone, and phenols, such as phenol, nonylphenol or bis-phenol, may also be used as such additional catalysts.

Examples of catalysts which consist of tertiary amines having isocyanate-reactive hydrogen atoms include: triethanolamine, triisopropanolamine, N-methyldiethanolamine, N-ethyl-diethanolamine, N,N-dimethyl-ethanolamine and their reaction products with alkylene oxides, such as propylene oxide and/or ethylene oxide.

Silaamines having carbon-silicon bonds as described, e.g. in German Pat. No. 1,229,290 (corresponding to U.S. Pat. No. 3,620,984) may also be used as additional catalysts, e.g. 2,2,4-trimethyl-2-silamorpholine or 1,3-diethylaminomethyl-tetramethyldisiloxane.

Basic nitrogen compounds, such as tetraalkylammonium hydroxides, alkali metal hydroxides, such as sodium hydroxide alkali metal phenolates, such as sodium phenolate, and alkali metal alcoholates, such as sodium methylate, may also be used as additional catalysts. Hexahydrotriazines are also suitable catalysts.

Organic metal compounds may also be used as catalysts according to the present invention, in particular organo-tin compounds.

The organo-tin compounds used are preferably tin(II) salts of carboxylic acids, such as tin(II)acetate, tin(II) octoate, tin(II)ethyl hexoate and tin(II)laurate, or tin-(IV) compounds, such as dibutyl tin oxide, dibutyl tin dichloride, dibutyl tin diacetate, dibutyl tin dilaurate, dibutyl tin maleate or dioctyl tin diacetate. The above-mentioned catalysts may, of course, be used as mixtures.

Further examples of catalysts which may be used according to the present invention and details concerning the activity of the catalyst are given in Kunststoff-Handbuch, Volume VII, published by Vieweg and Höchtlen, Carl-Hanser-Verlag, Munich 1966, e.g. on pages 96 to 102.

Surface active additives, such as emulsifiers and foam stabilizers, may also be used according to the present invention.

Suitable emulsifiers include, e.g. the sodium salts of ricinoleic sulphonate or salts of fatty acids with amines, such as oleic acid diethylamine or stearic acid diethanolamine. Alkali metal or ammonium salts of sulphonic acids, such as dodecylbenzenesulphonic acid or dinaphthylmethane disulphonic acid, or of fatty acids, such as ricinoleic acid, or of polymeric fatty acids may also be used as surface active additives.

Particularly suitable foam stabilizers are the polyether siloxanes, and especially those which are water-soluble. These compounds generally have a polydimethyl siloxane group attached to a copolymer of ethylene oxide and propylene oxide. Foam stabilizers of this kind have been described, for example, in U.S. Pat. Nos. 2,834,748, 2,917,480, and 3,629,308.

Other additives which may also be used according to the present invention include reaction retarders, e.g. acidic substances such as hydrochloric acid or organic acid halides; known cell regulators such as paraffins or fatty alochols or dimethyl polysiloxanes; pigments; dyes; known flame retarding agents such as trischloroethylphosphate, tricresyl phosphate or ammonium phosphate and polyphosphate; stabilizers against ageing and weathering; plasticizers; fungistatic and bacteriostatic substances; and fillers, such as barium sulphate, kieselguhr, and carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning the use and mode of action of these additives may be found in Kunststoff-Handbuch, Volume VII, published by Vieweg and Höchtlen, Carl-Hanser-Verlag, Munich 1966, e.g. on pages 103 to 113.

According to the present invention, the components are reacted together by the known one-shot process, the prepolymer process or the semi-prepolymer process, often using mechanical devices, such as those described in U.S. Pat. No. 2,764,565. Details concerning processing apparatus which may also be used according to the present invention may be found in Kunststoff-Handbuch Volume VII, published by Vieweg and Höchtlen, Carl-Hanser-Verlag, Munich 1966, e.g. on pages 121 to 205.

According to the present invention, the foaming reaction for producing foam products is often carried out inside molds. In this process, the foamable reaction mixture is introduced into a mold which may be made of a metal, such as aluminum, or a plastic material, such as an epoxide resin. The mixture foams inside the mold to produce the shaped product. This process of foaming in molds may be carried out to produce a product having a cellular structure on its surface or it may be carried out to produce a product with a compact skin and cellular core. According to the present invention, the desired result may be obtained either by introducing just sufficient foamable reaction mixture to fill the mold with foam after the reaction, or by introducing a larger quantity of reaction mixture than is necessary to fill the mold with foam. The second method is known as "overcharging", a procedure which has been disclosed, e.g. in U.S. Pat. Nos. 3,178,490 and 3,182,184.

Known so-called "external mold release agents", such as silicone oils, are frequently used when foaming is carried out inside molds. However, the process may also be carried out with the aid of so-called "internal mold release agents", if desired in combination with external mold release agents, e.g. as disclosed in German Offenlegungsschriften Nos. 2,121,670 and 2,307,589.

Cold setting foams may also be produced according to the present invention (see British Pat. No. 1,162,517 and German Offenlegungsschrift No. 2,153,086). Foams may, of course, also be produced by the process of block foaming or by the known laminator process.

The products of the process are preferably flexible, semi-flexible or rigid polyurethane foams. They are suitable for the known purposes for which such products are employed, e.g. as mattresses and padding material in the furniture and motor car industry, for the manufacture of armatures of the kind used in the motor car industry, for damping and shock absorbing materials, and for insulating against heat or cold, e.g. in the building industry and refrigeration industry.

As explained above, the polyurethane resins produced according to the invention (preferably polyurethane foams) may be coated or laminated with any synthetic resin foil, preferably with soft PVC. Polyurethane resins containing conventional catalysts in practice could only be laminated with black PVC or other synthetic resin foils because they gave rise to discoloration of the coating (K. Uhlig and J. Kohorst in Kunststoffe 66 (1976), 10, page 620). This troublesome effect may be avoided by using the catalysts according to the invention.

The polyurethane resins may be laminated with the synthetic resin foil (preferably PVC) by methods known per se, e.g. by applying the reacting polyurethane mixture to the resin foil or by applying the resin foil to the still tacky surface of the polyurethane and hardening the laminate. It is also possible to laminate a fully cured polyurethane with a synthetic resin foil by softening its surface by means of an IR-field or a flame and applying the synthetic resin foil on a calender. Still another possibility would be applying a commercial PVC-plastisol or pasty PVC which may contain any organic or inorganic dye pigment, to the polyurethane surface and hardening the coating in a drying channel. Preferably the coatings have a thickness of about 0.2 to 10 mm, most preferably 0.5 to 5 mm.

The following Examples serve to explain the process according to the present invention without limiting it. The quantities given are to be unerstood as parts by weight, or percentages by weight, unless otherwise indicated.

EXAMPLE 1

100 g of a mixture of:
100 parts of a copolyether of 87% propylene oxide and 13% ethylene oxide having an average molecular weight of 4,800 which has been started on trimethylolpropane, 2 parts of triethanolamine.
2.3 parts of water and
1.2 parts of a mixture of equal proportions by weight of bis-(dimethylamino-n-propyl)-amine and N-methyl-N'-(3-formylaminopropyl)-piperazine
are vigorously mixed with 46 g of the phosgenation product of a commercial aniline/formaldehyde condensate (viscosity: 200 cP at 25° C.). The mixture is applied to a commercial soft PVC foil having a thickness of 2 mm and containing a green anorganic pigment and allowed to foam. The PVC/polyurethane-foam laminate obtained is stored in a drying cupboard at 100° C. The fastness to light of the freely foamed product is determined separately in accordance with DIN 54 004.

Comparison Example 1a

Example 1 is repeated, but using 1.2 parts of tetramethylethylenediamine instead of the catalyst mixture according to the present invention.

Comparison Example 1b

Example 1 is repeated, but using 1.2 parts of N-dimethylamino-N'-(2-dimethylaminopropionyl)-aminal instead of the catalyst mixture according to the present invention.

The results of the experiments are summarized in the Table below:

| EXAMPLE | Color of PVC foil after heat treatment at 100° C. for. | | | Fastness to light (DIN 54 004) |
|---|---|---|---|---|
| | 120 hours | 165 hours | 192 hours | |
| 1 | unchanged | unchanged | unchanged | 6–7 |
| 1a | olive | brown | black | 3 |
| 1b | unchanged | olive | brown | 5 |

Example 2

The procedure is the same as in Example 1, but is carried out using 1.2 parts of bis-(3-dimethylamino-n-propyl)-amine.

The following results are obtained:

| Heating time at 100° C.: | 120 h | 165 h | 192 h |
|---|---|---|---|
| Color of PVC foil | unchanged | unchanged | unchanged |
| Fastness to light (DIN 54 004) | 7 | | |

Example 3

The procedure is the same as in Example 1, but using 1.2 parts of N,N-bis-(3-dimethylamino-n-propyl)-propylene diamine.

| Heating time at 100° C. | 120 h | 165 h | 192 h |
|---|---|---|---|
| Color of PVC foil. | unchanged | unchanged | pale olive |
| Fastness to light (DIN 54 004) | 6 | | |

Example 4

The procedure is the same as in Example 1, but using 1.2 parts of a mixture of equal portions by weight of bis-(3-dimethylamino-n-propyl)-amine and 1-N-formyl-4-N-(2-formylamino- ethyl)-piperazine.

The following results are obtained:

| Heating time at 100° C. | 120 h | 165 h | 192 h |
|---|---|---|---|
| Color of PVC foil | unchanged | unchanged | unchanged |
| Fastness to light (DIN 54 004) | 6–7 | | |

Example 5

The procedure is the same as in Example 1 but using 1.2 parts of a mixture of equal portions by weight of bis-(3-dimethylamino-n-propyl)-amine and methyl-bis-(3-N-formylaminopropyl)-amine.

The following results are obtained from thermal and photochemical ageing tests:

| Heating time at 100° C. | 120 h | 165 h | 192 h |
|---|---|---|---|
| Color of PVC foil | unchanged | unchanged | pale olive |
| Fastness to light (DIN 54 004) | 6 | | |

Example 6

The procedure is the same as in Example 1, but using 1.2 parts of a mixture of equal portions by weight of bis-(3-dimethylamino-n-propyl)-amine and dimethylamino-n-propyl-formamide.

The following results are obtained:

| Heating time at 100° C. | 120 h | 165 h | 192 h |
|---|---|---|---|
| Color of PVC foil | unchanged | unchanged | unchanged |
| Fastness to light (DIN 54 004) | 6-7 | | |

| Heating time at 100° C. | 120 h | 165 h | 192 h |
|---|---|---|---|
| Color of PVC foil | unchanged | unchanged | unchanged |
| Fastness to light (DIN 54 004) | 6-7 | | |

What is claimed is:

1. A process for the production of cellular or non-cellular polyurethane resins comprising reacting:
   (a) polyisocyanates; with
   (b) compounds having at least 2 isocyanate reactive hydrogen atoms; in the presence of
   (c) tertiary amines as catalysts; optionally with the addition of
   (d) blowing agents, stabilizers and other known additives; wherein the substances used as component (c) comprise compounds selected from the group consisting of

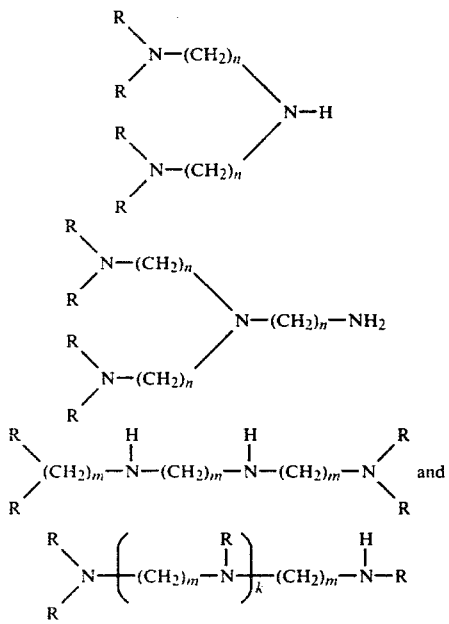

and mixtures thereof in which formulae:
   the symbols R may be the same or different and represent straight or branched-chain alkyl groups having from 1 to 4 carbon atoms,
   the symbols n may be the same or different and represent 2 or 3;
   the symbols m may be the same or different and represent 2 or 3; and
   k represents an integer of from 1 to 5.

2. The process of claim 1 wherein catalyst (c) is

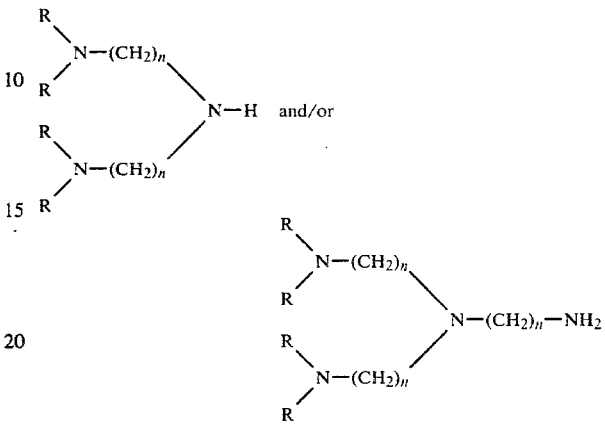

3. The process of claim 1 wherein component (c) is used as a mixture with other tertiary amines as co-catalysts.

4. The process of claim 2 wherein from 3 to 97 mol%, based on the whole catalyst mixture, of said co-catalysts is used.

5. The process according to claim 3, wherein from 10 to 90 mol% of co-catalysts is used.

6. The process of claim 4, wherein from 30 to 70 mol% of co-catalysts is used.

7. The process of claim 2 wherein said co-catalysts have at least one tertiary nitrogen atom and at least one amide group.

8. The process of claim 1, wherein from 30 to 70 mol% of co-catalysts based on the whole catalyst mixture is used which are formylation products of the compounds corresponding to the general formulae (1) to (4) in claim 1 and/or the following compounds:

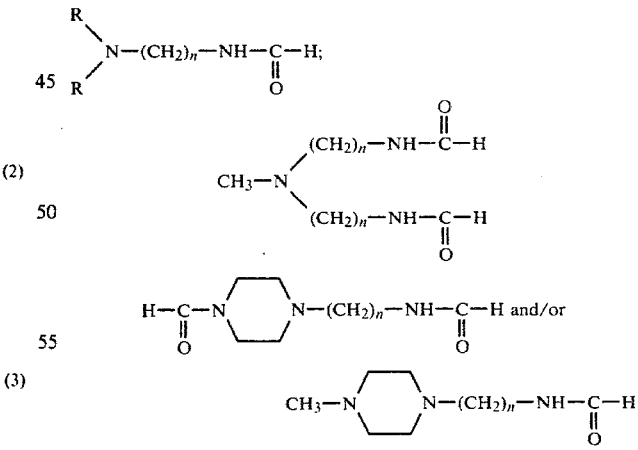

wherein R and n are as defined in claim 1.

9. The process of claim 1 or 2 wherein
   R represents a methyl group,
   m represents 2 and
   n represents 3.

10. A laminate comprising a synthetic resin foil covering a polyurethane resin produced by the process of claim 1.

* * * * *